Patented July 11, 1944

2,353,372

UNITED STATES PATENT OFFICE 2,353,372

METHOD OF PREVENTING FLUID LOSS FROM WELL HOLES INTO THE SURROUNDING EARTH

John B. Stone, Tulsa, Okla., assignor to The Dow Chemical Company, Midland, Mich., a corporation of Michigan No Drawing. Application June 17, 1940, Serial No. 340,989

6 Claims. (Cl. 252—8.5)

The invention relates to methods of restraining or preventing the passage of fluid from a well hole into surrounding earth and includes fluid mixtures easily retained in well holes. It more particularly concerns an improved fluid mixture and method for effecting the retention in a well hole of fluids, such as liquids or liquid suspensions of cement slurries, drilling muds, and like fluid aqueous and nonaqueous suspensions, which normally tend to pass from the well hole either as a whole or in part into the surrounding earth especially when under the influence of pressure, and for restraining such fluids from entering pores, crevices, and the like communicating with the bore of a well.

Although wells are usually put down for the purpose of obtaining a fluid of one kind or another, such as oil, gas, water, brine, or molten sulphur, from a subterranean bed, vein, or stratum, it frequently happens that it is desirable or necessary at some time in the life of such wells or during their boring to prevent fluids from draining away from inside the well hole through the well wall into the surrounding earth or rock. The necessity or desirability, as the case may be, of restraining or preventing fluid and fluid suspensions in the well hole or introduced thereinto from passing through or into the well wall may arise from many causes, some of which are mentioned below by way of example.

In the usual practice of forming a well hole, especially when of considerable depth, the boring operation is conducted with a drilling tool working in the presence of a drilling fluid which is often conventionally referred to as drilling mud. Such drilling fluid usually comprises a suspension of gel-forming materials including clay or clay-like materials, bentonite, etc., in water, the principal functions of the drilling fluid being to lubricate and cool the drill and suspend the cuttings produced by it so that they may be raised to the surface of the ground either by bailing the well hole from time to time as in cable tool drilling, or by circulating the fluid to the surface as in rotary drilling. In carrying out this method, the drilling fluid can serve its purpose so long as it does not pass or escape from the well hole into the pores, crevices, and the like of the surrounding earth or rock either as a whole or in material part. Formations that are relatively porous usually act as filtering media and permit the liquid portion of the circulating fluid to enter the surrounding earth, while particles of solid materials in suspension in the fluid tend to be filtered out on the walls of the hole, forming thereon a sheath. Such a sheath tends in many cases to prevent further loss of circulating fluid into the surrounding earth or rock. A disadvantage in such use of drilling fluid is that the liquid portion, or more generally the suspending medium comprising the fluid, may contaminate the earth or rock penetrated by the well bore and thus mitigate against the profitable use of the well for its intended purpose. Another disadvantage is that, when such filtration occurs, the sheath formed on the wall of the well bore usually is difficult to remove after the drilling operation is finished and production from the well is desired. This appears to be due to the fact that the suspended particles comprising the mud fluid tend to enter the pores and crevices in the face of the well hole while the sheath is forming, thereby firmly bonding the sheath to the walls of the well. This bonding of the sheath to the well walls is particularly undesirable on the portions which are later to admit fluid to the well as when it is put into production.

Then, again, in the operation of cementing a well hole as when casing the same with pipe, for example, which operation is usually practiced when the hole passes through a considerable depth of earth and rock that may be unconsolidated or carry undesirable fluids into the well hole, cement grout is used. Such grout generally comprises a water slurry of Portland cement, plaster of Paris, or other settable cementing material. Such slurries or suspensions are usually introduced into the well and by applying pressure are forced into the annular space between the pipe or casing and the walls of the well hole so as to fill and seal the annular space, or in other manner appropriate to the end in view. In employing such cementing materials as slurries and the like, similar difficulties therefore occasionally arise if the well hole which is to retain the cement penetrates earth or rock strata which admit such slurries or its suspending medium.

While drilling fluids, cement slurries, and the like are among the more important of the fluids introduced into well holes, the leakage from which must be guarded against, many examples can be cited of other liquids or fluids that are introduced into well holes for one purpose or another, the leakage of which it is desirable or necessary to prevent or reduce. For instance in the chemical treatment of wells with acids, solvents for paraffin or other fluid reagents, it is the usual practice to attempt to blanket off the lower portion of the well hole so as to prevent the reagent introduced into the well hole from having access to strata underlying the zone to be treated with the reagent, the blanketing being effected by introducing into the well hole a liquid or suspension generally of viscous or jellifying nature and sometimes of higher specific gravity than that of the treating reagent. The blanketing liquids employed for this purpose also tend to drain away through the more porous portions of the well hole wall similarly to drilling fluids, cement slurries, and the like or the liquid portion thereof, and thus present a similar problem as regards their retention in the well hole during treatment. In addition, the treating fluids or reagents used in well treatment themselves may at times tend to leak out of the well hole at some point below or above the zone it is desired to treat. Here again is another example of the same sort of problem.

The principal object of the invention is to provide a well fluid which does not readily pass through the wall of a well hole.

Another object of the present invention is to provide a method of preventing, restraining, or guarding against loss of fluid from a well hole into the surrounding earth or rock.

Another object is to provide a method of preventing loss of fluid suspensions from well holes.

Another object is to provide a method of preventing excessive loss of suspending medium from fluid suspensions of finely divided materials, which method not only tends to prevent the penetration of such materials into the pores, but also the building up of difficultly removable sheaths or like deposits on the wall of a well hole.

Another object is to provide a method of preventing loss of fluid suspensions or finely divided materials including cement slurries, mud fluids, organic and inorganic jellifying suspensions, and the like from a well hole into the surrounding formation.

Still other objects and advantages will become apparent from the following description of the invention hereinafter fully described and particularly pointed out in the claims.

According to the invention, the fluid, the loss of which into the formation is to be restrained or prevented, is converted into a lamellated fluid mixture by incorporating in the fluid a certain proportion of relatively thin, highly flexible, infrangible, water-insoluble and substantially fluid impervious lamellae or fragments of foil of organic nature.

In accordance with the application of the invention, it has been discovered that drilling muds, cement slurries, fluid blankets, water plugging agents, and other similar fluid materials can be prevented from escaping and being lost through the wall of the well hole or bore, when there is added to such materials lamellar substances which have the foregoing characteristics; and by such addition the foregoing fluids are converted into lamellated mixtures. Further characteristics of such a material are flexibility, pliability, and uniformity of thickness of individual pieces enabling them to be readily introduced into the well. Additional characteristics may include relatively high tensile strength which is practically unaffected by water, such as possessed by synthetic organic materials, ease of suspension in the medium or vehicle to which they are added, and the further characteristic of being grainless with relatively great tensile strength in all lateral directions, and having the ability to cover or close orifices, pores, and channel openings such as those occurring in the walls of the well.

Certain organic lamellae, in the form of relatively thin and fragmentary pieces, have the above characteristics, are exceptionally infrangible, and may be used according to the invention to treat the well hole. Among the various organic lamellae are certain reformed or regenerated cellulose materials or cellulose derivatives, which, when in the form of thin lamellae or sheet-like material, or small flat scraps or fragments thereof, have been found to have the above properties and characteristics, and to make excellent lamellae for the purposes of realizing the practice of this invention. Specifically it has been found that cellulose nitrate, cellulose hydrate, cellulose acetate, and other cellulose derivatives, such as the methyl and ethyl derivatives of cellulose may be used in lamellar form for the purpose of this invention. A preferred material is that obtained by chopping into fragments sheets of cellulose hydrate or cellulose acetate.

An example of a material of the foregoing type and adapted for use according to the invention is Cellophane (chemically altered cellulose) and a suitable form is the scrap available as a waste product of trimming operations on sheets of Cellophane which are of foil or film-like thickness, and cut to appropriate size such as to enable passage thereof through a screen of about ¼" to 1½" mesh. Thicknesses of foil of about 0.001" may be used although other thicknesses and dimensions are satisfactory. Such foil is usually perfectly smooth and the individual pieces tend to adhere to each other in storage. The individual pieces should be separated as by blowing a current of air through the stored mass before use. A preferred form of such material is that obtained when the conventional material which contains glycerine is subjected to deglycerizing. Deglycerized Cellophane is crinkled or wrinkled and does not tend to agglomerate in storage. In addition, it is more effective for the purpose of the invention due to its greater ease of dispersion in fluids, and because it is immediately available for use as required at the well hole without further treatment. Other similar synthetic organic foils may be used.

Pieces of chemically altered cellulose made by reducing sheets thereof having a thickness of 0.0008" into fragments ranging in size from ½" to 2" in width by ½" to 10" in length have been used effectively according to the invention.

While it is contemplated that the field of greatest commercial value of the invention will be in connection with well boring operations, wherein a circulating fluid, or suspension of mud, or the like, is circulated for carrying out the cuttings, it will be understood that the invention may also be used in connection with other processes wherein loss of fluid from a well hole is to be prevented or reduced, as, for example, in cementing operations, chemical well treating, and the like, wherein the fluid in the well is under sufficient pressure to be forced into the surrounding earth, as by this invention all such fluids can be rendered lamellated and thus retainable in a well hole.

It has been discovered, for example, that by introducing a sufficient amount of such lamellar material into the fluid or fluid suspensions, such as drilling muds, permanent sealing or cementing materials, such as Portland and gypsum cementing slurries, and the like, temporary sealing materials, such as organic jellifying materials of the type described in U. S. Patent No. 1,998,756, and the like, the tendency for loss thereof into the surrounding formation from a well hole is greatly reduced; if not practically prevented. At the same time the formation of any sheath that is not easily removable is practically eliminated.

The present improved method utilizes and takes advantage of the pressure conditions under which the materials employed may be introduced into the well so that the lamellar pieces will be effective in their operation. Thus it is sufficient to incorporate or suspend the lamellae in the fluid which is either in the well or introduced thereinto and utilize the same as a vehicle for carrying the lamellae to the well walls.

Therefore, the present invention is in nowise entirely dependent for its practice upon any specific medium, fluid, vehicle, or material as a carrying agent.

I will now describe a mode of carrying out my invention in connection with a conventional rotary well drilling operation for oil or gas or other fluid wherein a circulating fluid is employed and wherein a stratum of such nature as to permit the circulating fluid to enter and be lost is encountered. In such drilling operation there is generally used a hollow drill stem to which is attached a drill bit which is rotated in the earth or rock to form the well hole therein. During the rotation of the drill there is circulated down the hollow drill stem a fluid, such as an aqueous suspension of clay or clay-like material, such as bentonite in water. The fluid is discharged from the drill stem at the cutting head of the drill and there mingles with the cuttings produced by the drill bit. The mixture of cuttings and circulating fluid flows up the well hole and from there is discharged to a mud pit. Usually the fluid which is discharged from the well hole is passed through a mud screen which removes the larger cuttings before the fluid enters the mud pit where the finer cuttings are allowed to settle out. The fluid thus treated is returned to the drill stem for recirculation into the well hole. In the practice of my invention there is added to the circulating fluid, preferably while it is being withdrawn from the mud pit and introduced into the well, a quantity of lamellar material of the type described in amount sufficient to form a coating over those portions of the well hole through which suspending medium or circulating fluid has egress. The amount of lamellar material required and the particular instances during the drilling operation when its introduction into the drilling fluid is effected will vary according to the nature of the earth or rock formation encountered, as well as the size of the well hole and volume of fluid in circulation with which it is to be mixed, and other factors of generally less importance.

It has been found that the lamellae, as herein described, when added to drilling muds at the commencement of or during the drilling operations, will produce what is herein termed a lamellated mud or drilling fluid, and which will be retained readily in the well hole even in relatively porous formations encountered during the course of the drilling. When this practice is followed, it is recommended that approximately from ¼ to 10 pounds of lamellae be added for each barrel of average density drilling mud although other proportions may be used.

However, where loss of the drilling mud is experienced after the drilling has commenced, it is advisable to then introduce the lamellae directly into the mud pit at a point immediately adjacent the mud pump intake in generally larger amounts such as 15 to 100 pounds or more until the circulation of the drilling mud is re-established.

The lamellar material or lamellated drilling fluid thus introduced into the well hole is forced against those portions of the face of it from which fluid tends to escape forming a coating by virtue of the hydrostatic pressure of the fluid together with the pressure applied by the circulating pump if one is used. The coating which is thus formed renders the walls of the well hole practically impervious to not only the suspending medium of the circulating fluid, but also the fluid itself, and thus tends to prevent loss of fluid, and eliminates the formation of a difficultly removable sheath or cake on the well hole wall. The depositing or building up of a coating of lamellar material on the wall of the well hole normally continues until all such portions of it as tend to permit the escape of fluid are covered or sealed. The lamellar material which will not have become deposited on the wall of the well hole will be carried by the circulating fluid out of the well hole onto the mud screen before the circulating fluid reaches the settling pit. This portion of the lamellar material may be recovered for reuse. In addition, when such lamellar material appears to be circulated out of the well hole, it is usually an indication that sufficient has been introduced to serve its purpose.

Due to the nature of the lamellar material of the type defined, there is little if any tendency for it to separate or settle from the fluid in which it is used while being circulated, particularly if the fluid be aqueous. Both its physical form and specific gravity tend to cooperate to maintain it in suspension. These factors, especially when the lamellar fragments are crinkled, make its use advantageous not only in fluids which are in motion, as in the case of drilling fluids, but also in fluids which may be at rest for a time in the well hole, such as, for example, fluid bridging plugs, cement slurries, and the like. Other modes of carrying out the invention as applied to well drilling with a mud or drilling fluid may be practiced as will now be apparent.

As to other applications of the invention, organic materials, such as certain starches, gums, gelatines, and the like, in admixture with water, which are often used in wells because of their viscosity producing ability or gelling properties, can be treated advantageously according to the invention, as by incorporating therewith a suitable proportion of the lamellar material of the kind described. Such viscosity and gel producing materials, when treated according to the invention, show a reduced tendency to enter the pores, crevices, and the like in the wall of the well hole, and in most instances will remain in the well hole even under extreme pressure thereby increasing their usefulness and fitting them to produce new results.

It should be understood that the appropriate amounts of lamellae to be most advantageously used with the various types of fluid will vary to a great extent and over a wide range depending upon the particular fluid. Moreover, it must be remembered that the employment of the lamellae may be as a precautionary measure when definite information regarding the well may not be available by which it can be positively ascertained in advance if there exists an actual need. This same situation will also be true in many instances of well drilling and cementing. Therefore, it is recommended that whenever such fluids as cement slurries, circulation muds, and other fluids are employed in a well, that the lamellae be incorporated in such fluids so that the same are then lamellated, or comprise a lamellate. If this method is followed, then, when a porous formation is encountered, the lamella will be already present to function in the manner herein taught.

Among the advantages of the invention are that well fluids can be rendered lamellated in a manner to prevent fluid loss through the well hole wall, without impairing the normal functions of either the fluid or the wall of the well hole and its surrounding formation. The capability of lamellated fluid functioning as such persists without substantial impairment for relatively long time and permits in general the recovery and reuse of the lamella.

Having thus described the invention, what is claimed is:

1. A method of restraining a fluid against escape from a well hole through the wall thereof, which comprises introducing into the well hole to be incorporated in the fluid therein a substantial quantity of a relatively thin, highly flexible, infrangible, water-insoluble, fragmented organic grainless foil.

2. A method of restraining a fluid against escape from a well hole through the wall thereof, which comprises introducing into the well hole to be incorporated in the fluid therein a substantial quantity of a relatively thin, highly flexible, infrangible, water-insoluble, fragmented grainless cellulose foil.

3. A method of restraining a fluid against escape from a well hole through the wall thereof, which comprises introducing into the well hole to be incorporated in the fluid therein a substantial quantity of a relatively thin, highly flexible, infrangible, water-insoluble grainless foil formed of a cellulose derivative.

4. A method of restraining a fluid against escape from a well hole through the wall thereof, which comprises introducing into the well hole to be incorporated in the fluid therein a substantial quantity of fragmented Cellophane.

5. A circulating fluid for deep wells comprising a well mud fluid to which has been added a substantial proportion of fragmented Cellophane.

6. A well cementing fluid comprising a mixture of cement slurry and fragmented highly flexible, infrangible, water-insoluble organic grainless foil.

JOHN B. STONE.